United States Patent [19]

Matsumoto et al.

[11] Patent Number: 5,720,028
[45] Date of Patent: Feb. 17, 1998

[54] EXTERNAL STORAGE SYSTEM

[75] Inventors: Yoshiko Matsumoto, Minamiashigara; Kenji Muraoka, Odawara, both of Japan

[73] Assignee: Hitachi, Ltd., Tokyo, Japan

[21] Appl. No.: 660,685

[22] Filed: Jun. 5, 1996

[51] Int. Cl.[6] .......................... G06F 11/20; G06F 11/28; G06F 13/10
[52] U.S. Cl. .................. 395/182.07; 395/182.04; 395/182.03; 395/427
[58] Field of Search .................. 395/182.07, 182.04, 395/182.03, 441, 488, 427

[56] References Cited

U.S. PATENT DOCUMENTS

| | | | |
|---|---|---|---|
| 5,140,592 | 8/1992 | Idleman et al. | 395/182.03 |
| 5,274,645 | 12/1993 | Idleman et al. | 395/182.04 |
| 5,504,882 | 4/1996 | Chai et al. | 395/182.03 |
| 5,526,482 | 6/1996 | Stallmo et al. | 395/182.04 |
| 5,546,535 | 8/1996 | Stallmo et al. | 395/182.07 |
| 5,548,711 | 8/1996 | Brant et al. | 395/182.03 |
| 5,588,110 | 12/1996 | De Koning et al. | 395/182.03 |

FOREIGN PATENT DOCUMENTS

3-206529  9/1991  Japan.

Primary Examiner—Ly Hua
Attorney, Agent, or Firm—Antonelli, Terry, Stout, & Kraus, LLP

[57] ABSTRACT

An external storage system has a storage unit for storing data and a plurality of storage controllers for controlling data transfer between an upper level system and the storage unit. Each storage controller has a data buffer for temporarily storing data and a controller for controlling the operation of the storage controller. The external storage system has a management memory for storing management information of the plurality of storage controllers each of which accesses this memory to monitor the operation states of other storage controllers. The external storage system has a first storage controller for processing an input-output request from the upper level system and a second storage controller for standing by for backup for a failed storage controller. In accordance with load distribution information stored in the management memory, the process to be executed by the first storage controller is partially executed by the second storage controller to improve the performance of the whole external storage system.

20 Claims, 10 Drawing Sheets

EXTERNAL STORAGE SYSTEM

BACKGROUND OF THE INVENTION

1. Field of the Invention

The present invention relates to an external storage system, and more particularly to an external storage sub-system having multiple input/output controllers of a redundant structure for controlling an information input/output request from an upper level system.

2. Description of the Related Art

In an external storage sub-system constituting a computer system, if storage controllers for controlling information transfer between a storage system having storage media and an upper level system are not configured to be redundant, the sub-system is forced to be stopped if a failure occurs in any one of storage controllers. Recovery operation is performed while the sub-system is stopped. After the recovery operation, the storage controllers are reactivated or the sub-system is reactivated to resume interrupted tasks.

Recently, 24-hour operation style is increasing in various fields of information processing works using a computer system, and a continuous operation is requested also for an external storage sub-system. To this end, as described in, for example, JP-A-3-206529, an external storage sub-system with storage controllers of a redundant structure has been proposed in which while one storage controller is running, another storage controller stands by. With this external storage sub-system, if a failure occurs in the running storage controller, another stand-by storage controller is activated to replace the failed storage controller and to ensure a continuous system operation.

With this external storage sub-system, however, although a continuous operation is possible even during a failure, only one of the two storage controllers operates actually, and from the performance view point, this system is the same as a system with one storage controller. In other words, the stand-by storage controller functions only for hot stand-by and is merely an alternative for a failed storage controller.

Recent system requirements are various in type. For example, various interconnections are present in which an upper level system issues an access request from a plurality of paths to the same storage device or to different storage devices. It is therefore difficult for a conventional simple redundant structure of storage controllers to configure a system matching various user requirements.

In a conventional inexpensive system, a storage controller and a data buffer are fabricated on the same board. Therefore, for maintenance and management of the data buffer in the storage controller, it is impossible to disconnect only the data buffer, and the following procedure is required. After the system is temporarily stopped, the capacity of the data buffer is increased and thereafter, the storage controller and system are reactivated to resume interrupted task.

SUMMARY OF THE INVENTION

It is an object of the present invention to provide an external storage sub-system capable of improving reliability by using multiple storage controllers without the control by an upper level system and capable of improving performance by distributing a load to a storage controller standing by for backup.

It is another object of the present invention to provide an external storage sub-system capable of easily performing maintenance and management works for hardware, software, and the like of a plurality of storage controllers of a redundant structure, without stopping the system operation, by configuring the system so that a plurality of storage controllers can be disconnected from the external storage sub-system.

In order to achieve the above objects of the invention, an external storage sub-system of this invention comprises: a storage unit for storing data to be transferred to and from an upper level system; a plurality of storage controllers provided between the storage unit and upper level system for controlling data transfer between the upper level system and storage unit; and a management memory accessible by the plurality of storage controllers for storing management information of the plurality of storage controllers, wherein a first storage controller for receiving an input-output request from the upper level system stores the input-output request in the management memory as load distribution information, and a second storage controller refers to the load distribution information and processes the input/output request received by the first storage controller.

According to another aspect of this invention, an external storage sub-system comprises: a storage unit for storing data to be transferred to and from an upper level system; a plurality of storage controllers provided between the storage unit and upper level system for controlling data transfer between the upper level system and storage unit, the plurality of storage controllers each having switching means for switching to one of the storage controllers which controls the data transfer to and from the upper level system; and a management memory accessible by the plurality of storage controllers for storing information on the states of the plurality of storage controllers, wherein a first storage controller monitors a presence/absence of a failure of a second storage controller by referring to the management memory, and the second storage controller with a failure is disconnected.

With the above structure, in an external storage sub-system of this invention, for example, in an external storage sub-system in which reception of an input/output request from an upper level system is fixed to a first storage controller and a second storage controller stands by for backup of the first storage controller, the processes of the input/output process received by the first storage controller are partially executed by the second storage controller in accordance with load distribution information. Therefore, the load of the input/output request of the first storage controller can be distributed to the second storage controller. The process performance of an input/output request can be improved for an external storage sub-system which improves the reliability by making the second storage controller stand by for the first storage controller.

In an external storage sub-system in which an upper level system and first and second storage controllers are interconnected, for example, by SCSI interface in a daisy chain form and reception of an input/output request from the upper level system is fixed to the first storage controller, the first and second storage controllers are accessed at the same SCSIID.

A failure occurred in the first storage controller is detected from information on the states of the storage controllers, and the switching means switches to the second storage controller as the storage controller for receiving a request. The upper level system issues an I/O request at the same SCSIID even after the failure and is not required to attend to the switching. Thereafter, the degenerate operation enters by disconnecting the failed storage controller. After maintenance works for exchange of components or microprograms, the first storage controller is recovered to a normal state and the original redundant structure is recovered.

Each storage controller has a data buffer. Consider the case where the first storage controller receives write data from the upper level system and performs a write-after process. In this case, a failure in the first storage controller is detected by monitoring means and the switching means switches the storage controller for receiving an input/output request from the first storage controller to the second storage controller. At the same time, a process of writing data into multiple data buffers is changed to a process of writing data selectively into the data buffer of the storage controller under operation.

At this time, a write-after process or a write-through process is selected. This selection can be realized by a user who sets data transfer mode information to the management memory. Specifically, if the user requests for high data reliability, the write-through mode is set, and if the user requests for high performance rather than high reliability, the write-after mode is set.

Since selective writing or multiple writing into data buffers can be selected after the recovery of the second storage controller, it is possible to switch to the process of multiple writing into data buffers and recover the redundant structure.

Consider the case where the first storage controller receives an input/output request from the upper level system, and in response to a write request from the upper level system, the write data is double-written into the data buffers of both the first and second storage controllers and the write-after process is performed. In this case, the multiple writing process is switched to the selective writing process and the second storage controller is disconnected and degenerated. After the maintenance for increasing the capacity of data buffers, for exchanging microprograms, or for others, the original redundant structure is recovered. Thereafter, the second storage controller notifies the first storage controller of a maintenance completion such as increasing the data buffer capacity by using the communication means capable of communicating with storage controllers. After this notice, the switching means switches to its storage controller for receiving a request from the upper level system.

The first storage controller received the notice degenerates itself and after the maintenance such as increasing the data buffer capacity, recovers the normal state. After this recovery, the first storage controller notifies the second storage controller of a maintenance completion such as increasing the data buffer capacity by using the communication means capable of communicating with storage controllers. At this timing, the selective data writing into one data buffer is changed to the multiple data writing into a plurality of data buffers. In this manner, while a pair of first and second storage controllers continues the input/output process from the upper level system, it is possible to perform maintenance and management works for increasing the capacity of data buffers, for exchanging micro-programs, or for others.

Also, according to the invention, by referring to the management information stored in management information storage means indicating which one of a plurality of storage controllers receives an input/output request, the first and second storage controllers can judge which one of them receives the request from the upper level system. For example, not only both the first and second storage controllers but also one of them can be determined to receive an input/output request from the upper level system. If a user sets the management information, the storage controller receiving a request from the upper level system can be designated as desired by the user.

DESCRIPTION OF THE PREFERRED EMBODIMENTS

Embodiments of the present invention will be described with reference to the accompanying drawings.

Figure 1:
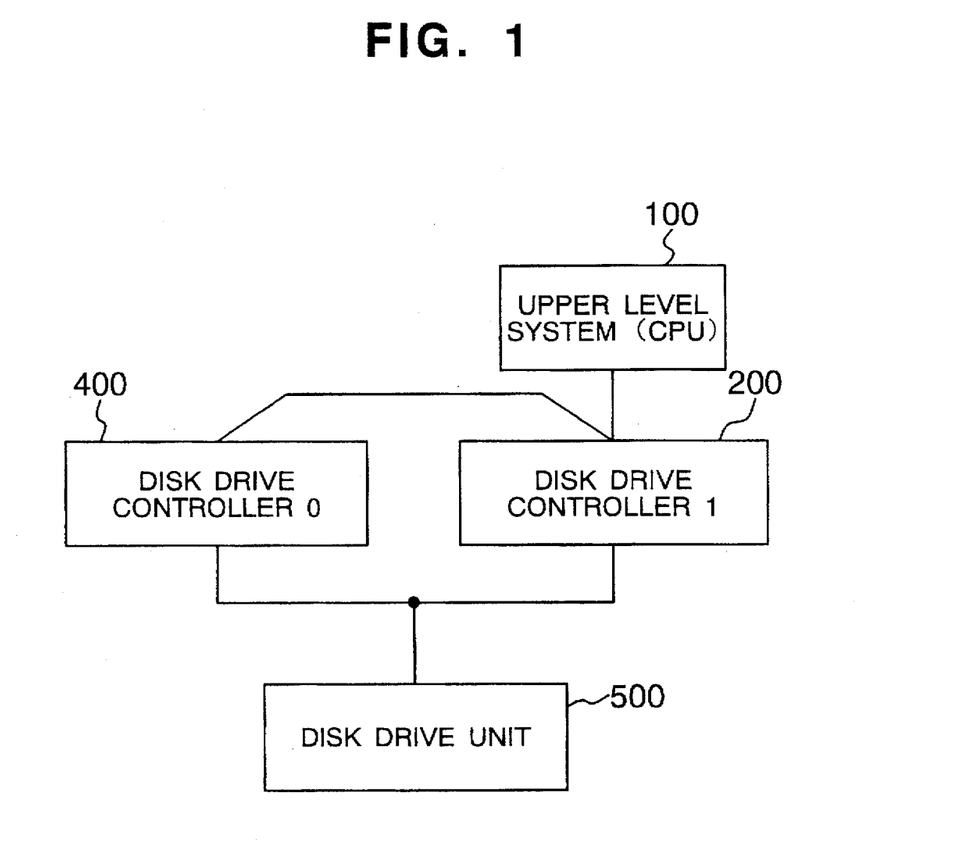
FIG. 1 illustrates the concept of an example of a computer system including an external storage system according to an embodiment of the invention.

FIG. 1 illustrates the concept of an example of a computer system including an external storage sub-system according to an embodiment of the invention. The computer system of this embodiment includes an upper level system 100 made of a central processing unit and an external storage sub-system constituted by disk drive controllers 200 and 400 and a disk drive unit 500. The disk drive controllers 200 and 400 are connected to the upper level system 100 in a daisy chain form of SCSI interface, and assigned the same SCSIID to configure a redundant structure. In this embodiment, in response to a request from the upper system 100, the disk drive controller 200 executes a process included in the received request to control the disk drive unit 500, the process being executed also by the redundant disk drive controller 400.

Figure 2:
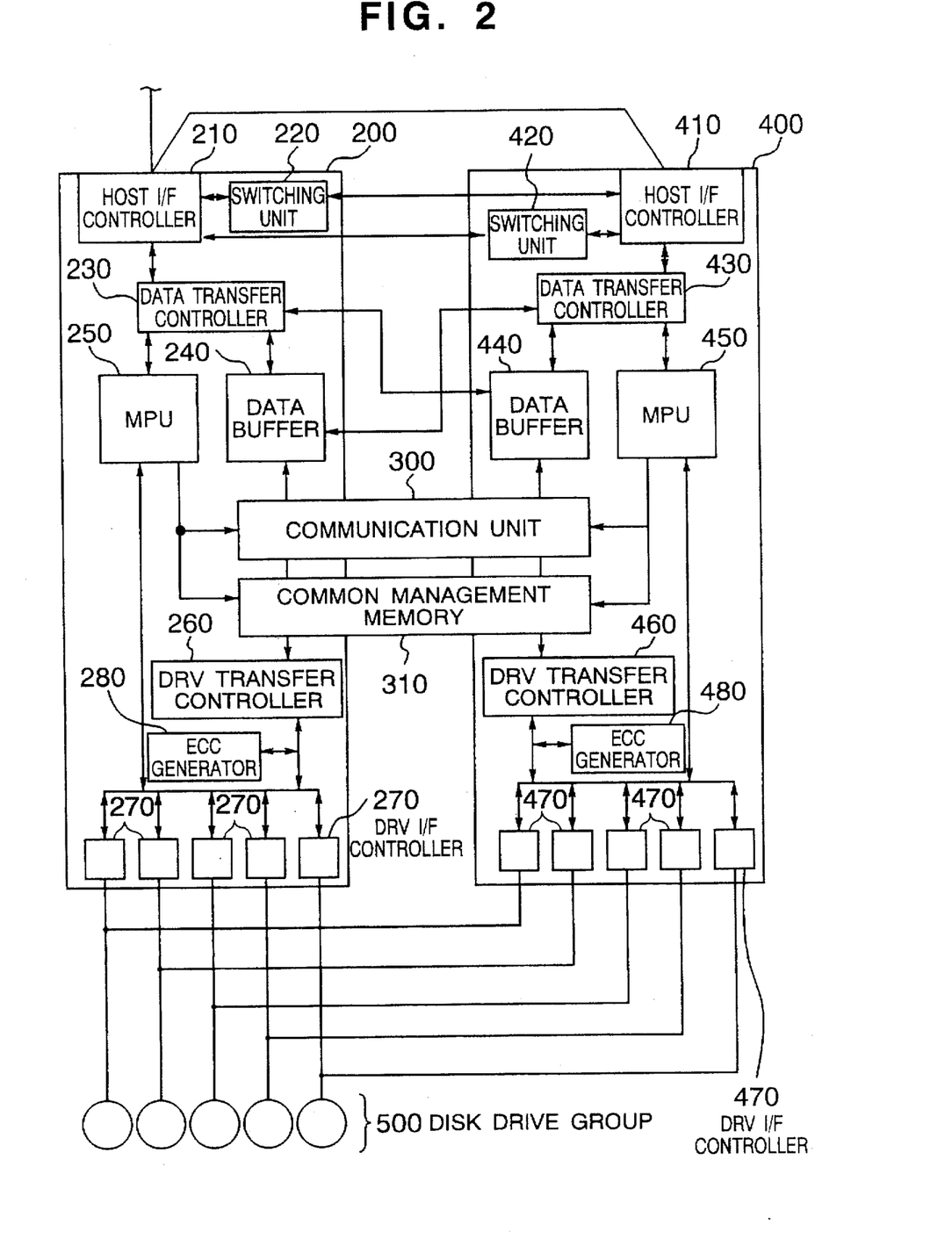
FIG. 2 is a block diagram showing an example of the internal structure of a disk drive controller constituting an external storage system according to an embodiment of the invention.

FIG. 2 is a block diagram showing an example of the internal structures of the disk drive controllers 200 and 400. Both the internal structures of the disk drive controllers 200 and 400 are the same. Therefore, the description will be given for the disk drive controller 200 by way of example and the internal structure of the disk drive controller 400 is omitted by assigning the same lower two digits as the corresponding elements of the disk drive controller 200.

A microprocessor unit 250 (hereinafter called MPU) sequentially decodes and executes a microprogram stored in a random access memory (RAM, not shown) to control the whole of the disk drive controller 200.

A host I/F controller 210 controls protocol used with the upper level system 100. A DRV I/F controller 270 controls protocol used with the disk drive unit 500. A data buffer 240 is used for data transfer between the host IF controller 210 and DRV I/F controller 270. This memory may be a volatile or non-volatile memory. In this embodiment, the following description assumes that the data buffer 240 is a volatile memory.

A switching unit 220 switches between the host I/F controllers 210 and 410 of the disk drive controllers 200 and 400 to select the host I/F controller which receives I/O from the upper level system 100. In this embodiment, it is assumed that the host I/F controller 210 receives I/O from the upper level system 100. A data transfer controller 230 controls data transfer between the upper level system 100 and a data buffer 240. The data transfer controller 230 has both the functions of storing write data from the upper level system 100 into both the data buffers 240 and 440 (hereinafter called "double write") and storing the write data only in the data buffer 240 (hereinafter called "single write"). It is possible to switch between the double write and single write in accordance with an instruction from MPU 250.

A DRV transfer controller 260 controls data transfer between the data buffer 240 and disk drive unit 500.

A communication unit 300 is used for transferring information between MPU 250 and MPU 450. This communication unit 300 can bidirectionally transfer information between MPU 250 and MPU 450.

A common management memory 310 can be referred to or updated, by both MPU 250 and MPU 450.

In this embodiment, data from the upper level system is distributively stored in a plurality of drives of the disk drive unit 500. In the following, a disk array will be described illustratively.

An ECC generator 280 has a function of generating parity data of the data sent from the upper level system 100. This function can be used for recovering data. The unit of adding parity data may be a unit of one logic data sent from the upper level or a unit of a plurality of logic data. In this embodiment, parity data is added for each set of four logic data, and is written in conformity with a RAID5 scheme which does not fix a drive in which the parity data is stored.

Figure 3:
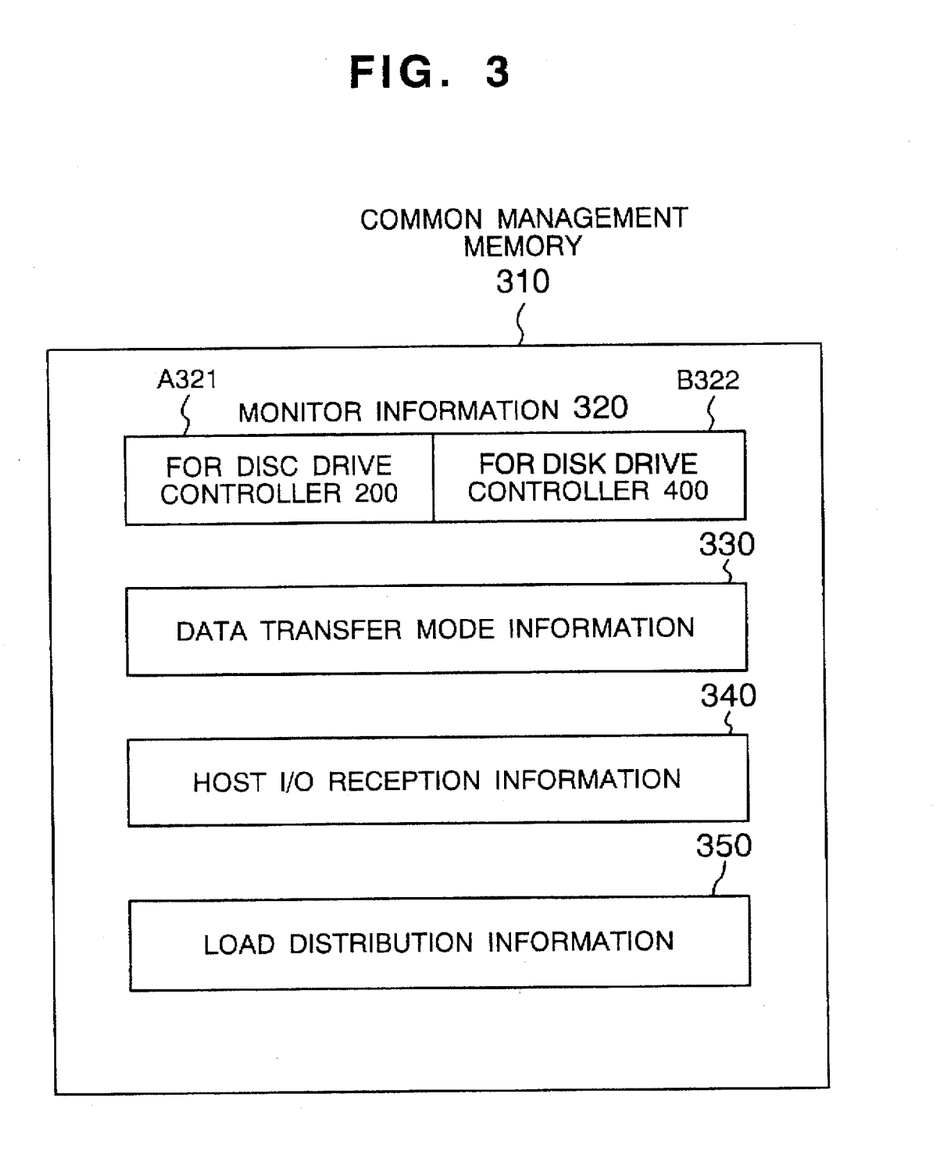
FIG. 3 illustrates the concept of an example of the structure of a common management memory used by the external storage system of the embodiment.

Next, an example of the structure of the common management memory 310 will be described with reference to FIG. 3. Monitor information is used for checking whether each disk drive controller 200/400 operates normally. If it is judged that MPU 250 of the disk drive controller 200 can operate normally, monitor information A321 indicating a normal state is set at a predetermined interval. If it is judged that MPU 250 cannot operate normally, monitor information A321 indicating an abnormal state is set. Similar monitor information B322 to that of MPU 250 is set also for MPU 450 of the disk drive controller 400.

Data transfer mode information 330 instructs a completion report timing of a write data request from the upper level system 100, during a system degenerate state. Specifically, this information is used for judging whether the timing when the completion report is supplied to the upper level system 100, is at the write completion into the data buffer 240 or 440 (hereinafter called write-after mode) or at the write completion into the disk drive unit 500 from the data buffer 240 (hereinafter called write-through mode).

Host I/O reception information 340 indicates a disk drive controller 200/400 which receives I/O. In this embodiment, it is assumed that the disk drive controller 200 receives an I/O (input-output) request from the upper level system 100.

Load distribution information 350 indicates load distribution of a process of an I/0 request from the upper level system, into the two disk drive controllers 200 and 400. As a method of distributing a load, disk drives accessed by each disk drive controller may be assigned to each controller, or a process of an I/O request from the upper level system 100 may be discriminated from a process asynchronous with an I/0 request from the upper level system 100 in which write data is asynchronously stored in the disk drive unit 500 from the data buffer. Alternatively, all processes of an I/0 request are written in the load distribution information to execute the processes by two MPUs.

In this embodiment, the method will be described in which a process of an I/0 request from the upper level system 100 is discriminated from a process asynchronous with an I/O request from the upper level system 100 in which write data is asynchronously stored in the disk drive unit 500 from the data buffer 240/440. It is therefore assumed in this embodiment that the load distribution information 350 includes the information on the write data stored in the data buffer 240/440.

Next, data read/write processes of the upper level system 100 relative to the disk drive unit 500 of the computer system of this embodiment will be described.

Upon a write request from the upper level system 100, the disk drive controller 200 receives write data via the host I/F controller 210. The data transfer controller 230 stores in duplicate the write data into the data buffers 240 and 440, sets information regarding the write request to the load distribution information 350 of the common management table 310, and at this time reports a completion to the upper level system 100. Thereafter, the disk drive controller 200 can receive the next I/0 request from the upper level system. On the other hand, the disk drive controller 400 writes the write data received by the disk drive controller 200 from the upper level system into the disk drive unit 500, asynchronously with the processes of the disk drive controller 200. Specifically, MPU 450 refers to the load distribution information 350, and if there is information regarding the write request, reads data (hereinafter called old data) already stored at an address at which the write data is to be written and old parity data for the old data, from the disk drive unit 500 via the DRV I/F controller 470 and DRV transfer controller 460. The ECC generator generates parity data (hereinafter called new parity data) of the write data in accordance with the write data, old data, and parity data. The generated new parity data and the write data are written into the disk drive unit 500 via the DRV I/F controller 470 and DRV transfer controller 460. In this manner, the write data is stored in the disk drive unit 500. The process of reading old data and old parity, the process of generating the new parity data, and the process of storing the new parity data, are called write penalty of RAID5.

As described above, a store request of write data from the upper level system 100 is a process having a very high load if the disk drive unit 500 is used as a disk array. If this process is distributively executed by the two disk drive controllers 200 and 400, the system efficiency and performance can be improved more than when only one disk drive controller is used. Particularly in recent market trend, a very important factor, in addition to high performance and reliability, is to mount an inexpensive processor and reduce the whole system cost. The system performance is degraded by a number of accesses to disk drives during the write penalty process. Rather than this performance degradation, a long run time of microprograms of the microprocessor controlling the write penalty process may often become a bottleneck of the system performance. As in this embodiment, the better performance by about a twofold can be obtained by using the two disk drive controllers 200 and 400.

Upon a read request from the upper level system 100, MPU 250 starts reading data from the physical drive (disk drive unit 500) via the DRV I/F controller 270 and DRV transfer controller 260, and transfers the read data to the upper level system 100. In this case, if the read request addresses sent from the upper level system 100 are consecutive, the disk drive controller 400 judges the request as a sequential read process, and may read a predetermined amount of data succeeding the read request address from the data buffers and store it in the data buffers 240 and 440 asynchronously with I/O from the upper level system 100. In this manner, when the next I/O request is issued from the upper level system, the subject data is already in the data buffers 240 and 440 so that the data can be transferred without any time-consuming access to the disk drive unit 500 and the performance of the whole system can be improved.

Although a redundant structure is used, not only reliability but also performance can be improved by making a redundant portion (in this embodiment, the disk drive controller 400) execute part of a process without making it stand by merely as an alternative when a failure occurs.

Next, the operation of switching and recovery during failure while the two disk drive controllers 200 and 400 executing a process will be described. First, a monitor procedure for detecting a failure will be described.

While MPUs 250 and 450 control the disk drive controllers 200 and 400, MPU 250 sets information indicating a normal state (hereinafter called normal information) to the monitor information 321 whereas MPU 450 sets the normal information to the monitor information 322. In this case, in order to indicate that the normal information is set at a predetermined time interval, information sequentially changing is set to the monitor information. For example, information sequentially incremented by 1 may be used. If each MPU 250, 450 judges that the corresponding disk drive controller 200, 400 cannot operate normally, e.g. if the data buffer cannot be accessed from MPU, information indicating an abnormal state (hereinafter called abnormal information) is set to the monitor information. In the following, an example of the monitor procedure will be described with reference to the flow chart shown in FIG. 4.

Figure 4:
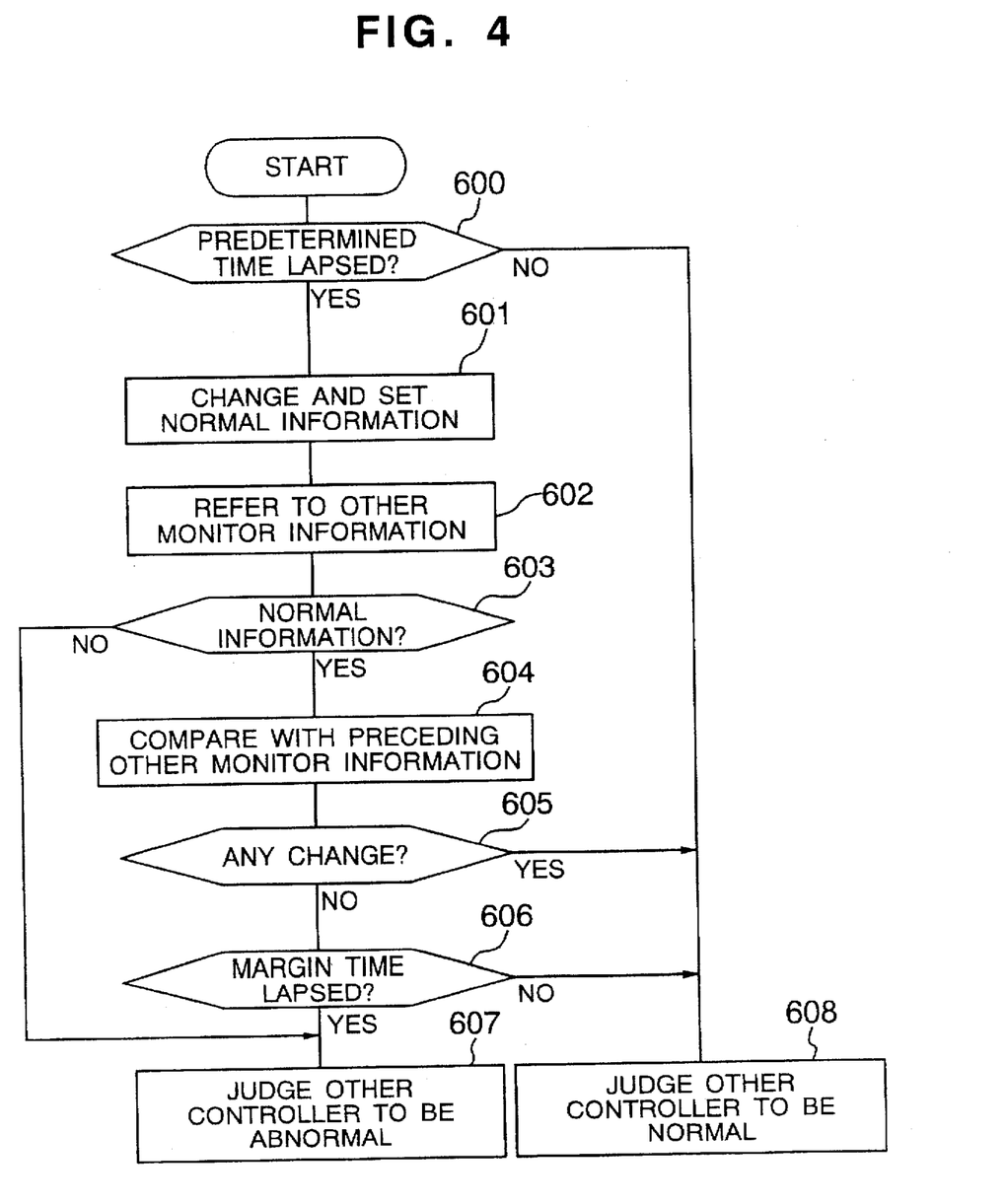
FIG. 4 is a flow chart illustrating an example of the monitor procedure of the embodiment.

In the following, the operation of MPU 450 of the disk drive controller 400 which monitors the other disk drive controller 200 will be described by way of example.

First, MPU 450 judges at Step 600 whether a predetermined time has lapsed. If not lapsed, the flow advances to Step 608 whereat it is judged whether the disk drive controller 200 is normal.

If the predetermined time has lapsed, the flow advances to Step 601 whereat the normal information indicating that MPU 450 is normal, is set. At Step 602 the monitor information A321 of the disk drive controller 200 is referred to and it is judged whether this information is normal or not at Step 603. If normal, the flow advances to Step 604, whereas if abnormal, the flow advances to Step 607 whereat it is judged that the disk drive controller 200 is in an abnormal state.

If normal at Step 603, the flow advances to Step 604 to compare the normal information with the preceding normal information and at Step 605 it is judged if there is any change in the normal information. Since there is a possibility that MPU 250 cannot set the monitor information because of a failure of microprogram, such a failure is checked at Step 605. If there is any change, the flow advances to Step 608 whereat it is judged to be normal. If there is no change, the flow advances to Step 606 whereat it is judged whether a margin time longer than a predetermined time has lapsed. If lapsed, the flow advances to Step 607 to judge to be abnormal, whereas if not lapsed, the flow advances to Step 608 to judge to be normal. With the above monitor procedure, both the hard ware failure and software failure can be detected.

Figure 5:
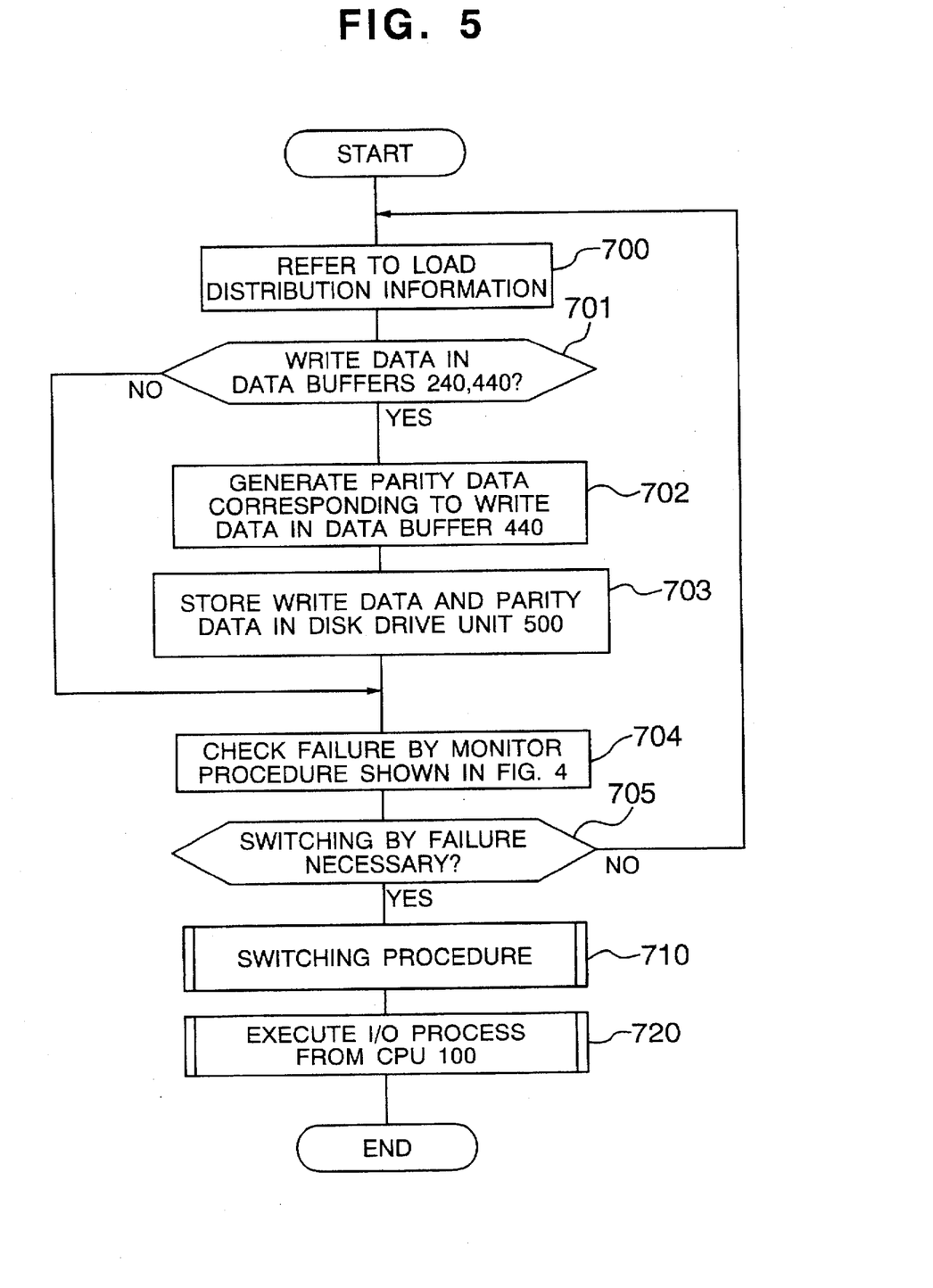
FIG. 5 is a flow chart illustrating an example of the operation of the external storage system of the embodiment.

Next, with reference to the flow chart shown in FIG. 5, the operation of the disk drive controller 400 will be described wherein the controller 400 detects a failure of the other disk drive controller 200 and replaces the controller 200.

First, at Step 700 MPU 450 sequentially refers to the load distribution information 350. If write data from the upper level system 100 is not stored in the data buffers 240 and 440 at Step 701, the flow advances to Step 704. If write data is stored, the flow advances to Step 702 whereat the old data and old parity corresponding to the write data are read from the disk drive unit 500 so as to generate parity data for the write data stored in the data buffer 440 and the ECC generator 480 generates new parity data. Thereafter, at Step 703, the write data and new parity data are stored in the disk drive unit 500 via the DRV transfer controller 460 and DRV I/F controller 470. Next, at Step 704 it is checked from the monitor procedure at Step 600 and following Steps shown in FIG. 4 whether the disk drive controller 200 has any failure. If normal, the flow advances to Step 700 to repeat the process. If it is judged that switching is necessary, the flow advances to Step 710 whereat reception of I/O from the upper level system 100 is switched from the disk drive controller 200 to the disk drive controller 400 in accordance with the switching procedure. The I/O process from the upper level system 100 executed by the disk drive controller 200 is switched to the disk drive controller 400 at Step 720.

Figure 6:
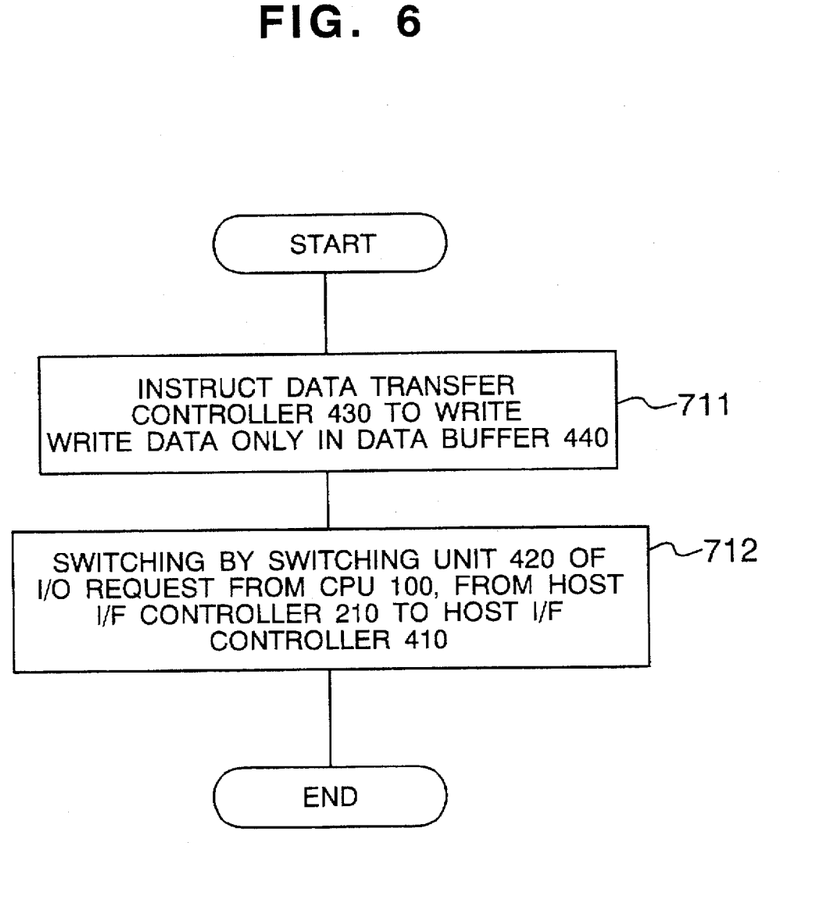
FIG. 6 is a flow chart illustrating an example of the operation of the external storage system of the embodiment.

Next, an example of a switching procedure 710 will be described with reference to the flow chart shown in FIG. 6.

First at Step 711, when write data is received from the upper level system 100, the data transfer controller 430 is instructed to single-write the data in the data buffer 440. Specifically, since the data buffer usable is only in the disk drive controller 400 until the failed disk drive controller 200 is degenerated and disconnected and the defective portion is replaced to recover the normal state, data cannot be double-written as in the normal redundant structure.

At Step 712, the switching unit 420 instructs to switch the I/O request from the upper level system 100, from the host I/F controller 210 to the host I/F controller 410. The host I/F controller 210 does not therefore receive the I/O request from the upper level system 100, but the host I/F controller 410 receives the request from the upper level system 100 so that the disk drive controller is switched substantially. However, in this embodiment, since the same SCSIID is used, the upper level system 100 issues the same SCSIID as before switching of I/O and is not required at all to know the switching of the disk driver controller on the reception side.

Figure 7:
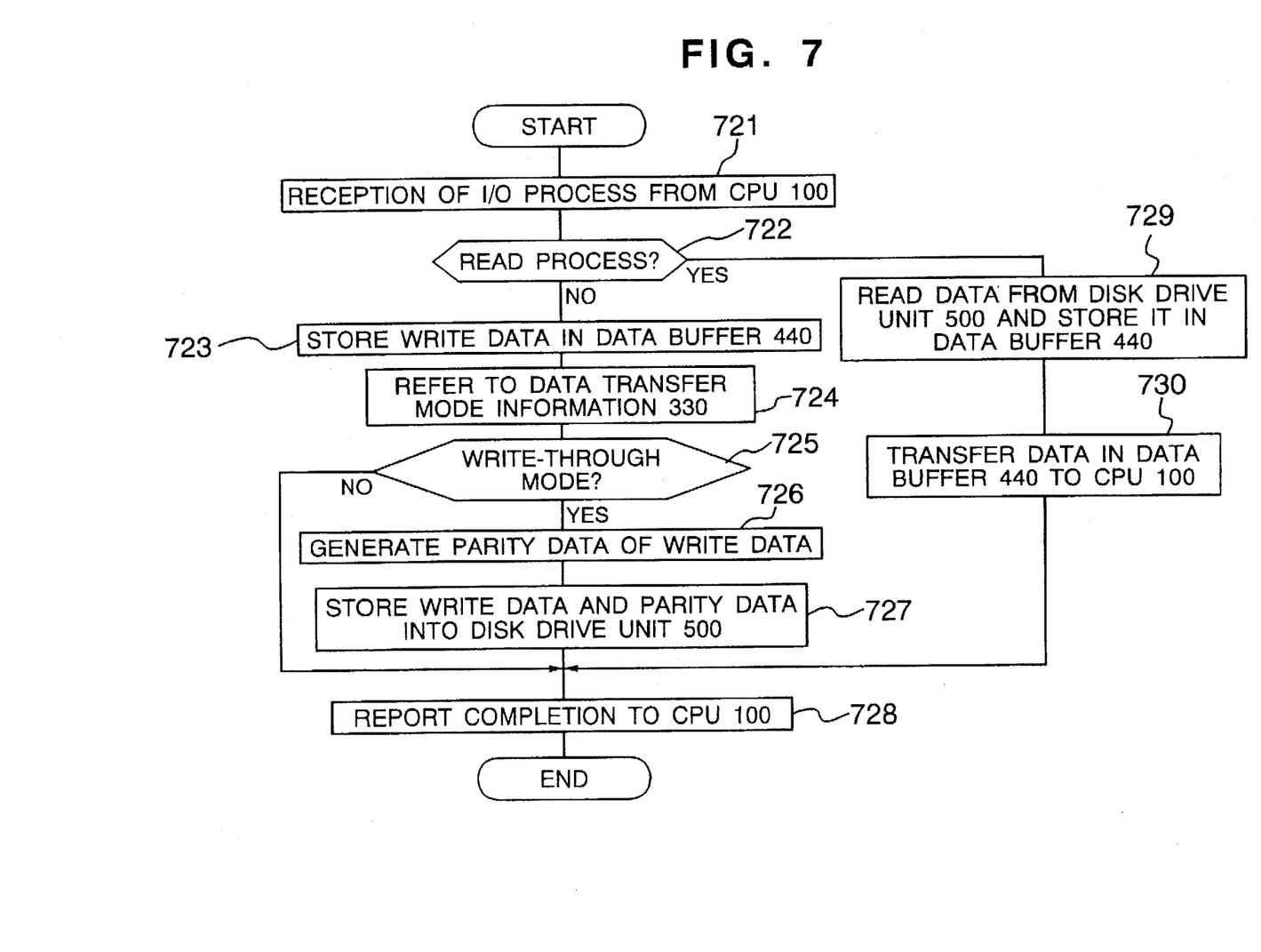
FIG. 7 is a flow chart illustrating an example of the operation of the external storage system of the embodiment.

Next, with reference to the flow chart shown in FIG. 7, an example of the procedure will be described wherein the switched disk drive controller 400 executes I/O.

After an I/O process is received from the upper level system 100 at Step 721, it is checked at Step 722 whether it is a read request or a write request. If a read request, the data is read from a disk drive of the disk drive unit 500 corresponding to the read request and stored in the data buffer 440 at Step 729. Thereafter, at Step 730 the data is transferred from the data buffer 440 to the upper level system 100 and at Step 728 a completion report is sent to the upper level system 100.

If a write request, the write data is stored in the data buffer 440 at Step 723. Thereafter at Step 724 the data transfer mode information 330 is referred to and it is judged at Step 725 whether the mode is a write-through mode. If a write-after mode, i.e., if a completion report to the upper level system 100 is sent at the timing when the data is stored in the data buffer 440, then the flow advances to Step 728 whereat a completion is reported, and at the later time the data in the data buffer 440 is asynchronously stored in the disk drive unit 500. If a write-through mode, parity data of the write data is generated at Step 726, the write data and new parity data are stored in the disk drive unit 500 at Step 727, and a completion report is issued at Step 728. Thereafter, Steps 700 to 703 shown in the flow chart of FIG. 5 are executed to execute the process assigned before the switching.

As above, according to this embodiment, the disk drive controllers 200 and 400 can be automatically switched and the execution of the process continues, without any instruction from the upper level system 100 and with transparency to the upper level system 100.

Next, an example of a control method will be described wherein the disk drive controller 200 recovers the original redundant structure.

Figure 8:
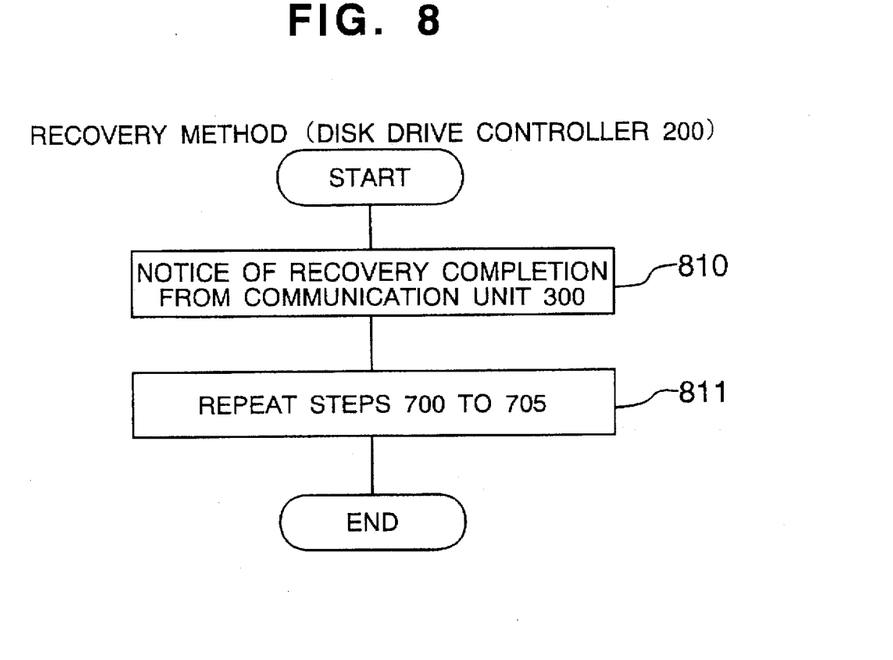
FIG. 8 is a flow chart illustrating an example of the operation of the external storage system of the embodiment.

First, an example of a recovery operation on the side of the disk drive controller 200 will be described with reference to the flow chart shown in FIG. 8. First at Step 810, the communication unit 300 notifies the disk drive controller 400 of a recovery completion. Thereafter, the disk drive controller 200 becomes a redundant disk drive controller and the roles of the disk drive controllers 200 and 400 are exchanged. At Step 811, the asynchronous de-stage process (Steps 700 to 705 in FIG. 5) previously executed by the disk drive controller 400 is performed.

Figure 9:
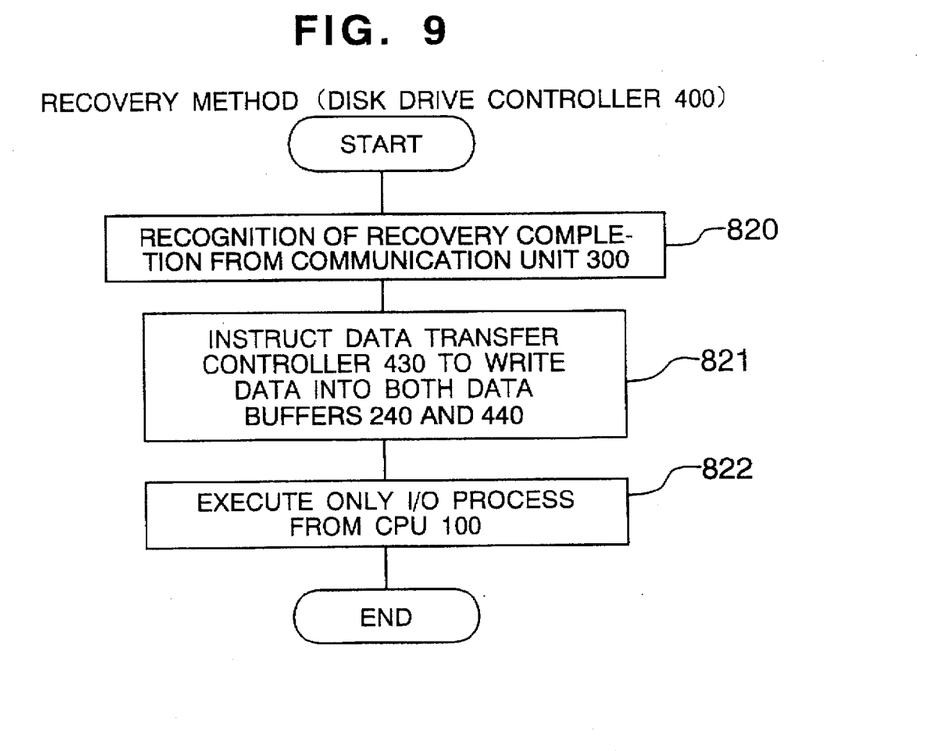
FIG. 9 is a flow chart illustrating an example of the operation of the external storage system of the embodiment.

With referent to the flow chart of FIG. 9, an example of the operation of the disk drive controller 400 received the recovery completion report will be described.

Upon recognition of the recovery completion of the disk drive controller 200 from the communication unit 300 at Step 820, the data transfer controller 430 is instructed at Step 821 to double-write data into the data buffers 240 and 440. At Step 822, only the I/O process from the upper level system 100 is executed. In this manner, the original redundant structure can be recovered while receiving the I/O request from the upper level system 100. Furthermore, the load of the process is distributed to the two disk drive controllers 200 and 400 so that the system performance can be improved.

Next, an example of a method of increasing the memory capacity of the data buffer in operation of the disk drive controller 200/400 will be described with reference to the flow chart shown in FIG. 10. It is assumed that the disk drive controller receiving I/O from the upper level system 100 is the disk drive controller 200.

When a request of increasing the capacity of the data buffer is received, it is checked at Step 911 whether the disk drive controller is on the I/O reception side. First, the process at the disk drive controller 200 will be described. Since the disk drive controller 200 is on the I/O reception side, it is first confirmed at Step 912 whether the disk drive controller 400 has been degenerated and disconnected. Then, the data transfer controller 230 is instructed to single-write write data only into the data buffer 240. Thereafter at Step 913 an I/O process from the upper level system 100 is executed, and Steps 700 to 703 shown in FIG. 5 are executed at Step 914. In other words, the process previously executed by the disk drive controller 400 is executed by the disk drive controller 200. While Steps 913 and 914 are repeated, a recovery completion of the disk drive controller 400 is waited for.

Next, also the disk drive controller 400 judges at Step 911 whether the corresponding disk drive controller is on the I/O reception side. Since the disk drive controller 400 is not on the I/O reception side, the disk drive controller 400 is not disconnected and at Step 916 the capacity of the data buffer 440 is increased. After the capacity is increased, a recovery completion is notified at Step 917 via the communication unit 300 to the disk drive controller 200.

It is necessary to increase next the capacity of the data buffer 240 of the disk drive controller 200. Therefore, the host I/F controller for receiving I/O is switched at Step 919 to its own by using the switching unit 420 in order for the disk drive controller 400 to receive I/O in place of the disk drive controller 200. Thereafter, the I/O process from the upper level system 100 is executed at Step 920, and Steps 700 to 703 shown in FIG. 5 are executed at Step 921 to wait for the recovery completion of the disk drive controller 200.

The disk drive controller 200 recognized the recovery at Step 918 via the communication unit 300 is disconnected at Step 922, and the capacity of the data buffer 240 is increased at Step 923. After the capacity is increased, at Step 924 the recovery is notified to the disk drive controller 400 via the communication unit 300. After this notice, since the disk drive controller 200 is not on the host I/O reception side, this controller 200 executes Steps 700 to 705 shown in FIG. 5 at Step 925.

Upon recognition by the disk drive controller 400 of the recovery of the other controller 200 via the communication unit 300, at Step 927 the disk drive controller 400 instructs the data transfer controller 430 to double-write write data both in the data buffers 240 and 440. At Step 928 an I/O process from the upper level system 100 is executed.

In the above manner, the capacities of the data buffers 240 and 440 can be increased while I/O from the upper level system 100 is executed. Specifically, in this embodiment, the capacities of the data buffers can be increased on line, in contrast to the conventional case where it is not possible unless the system is stopped. Particularly, if inexpensive disk drive controllers each fabricated on one board are used in the system configuration, each board is required to be replaced so that the capacity increase during operation is impossible. According to this embodiment, increasing the capacities of data buffers is possible while each of the disk drive controllers 200 and 400 of a redundant structure is degenerated and recovered.

Figure 10:
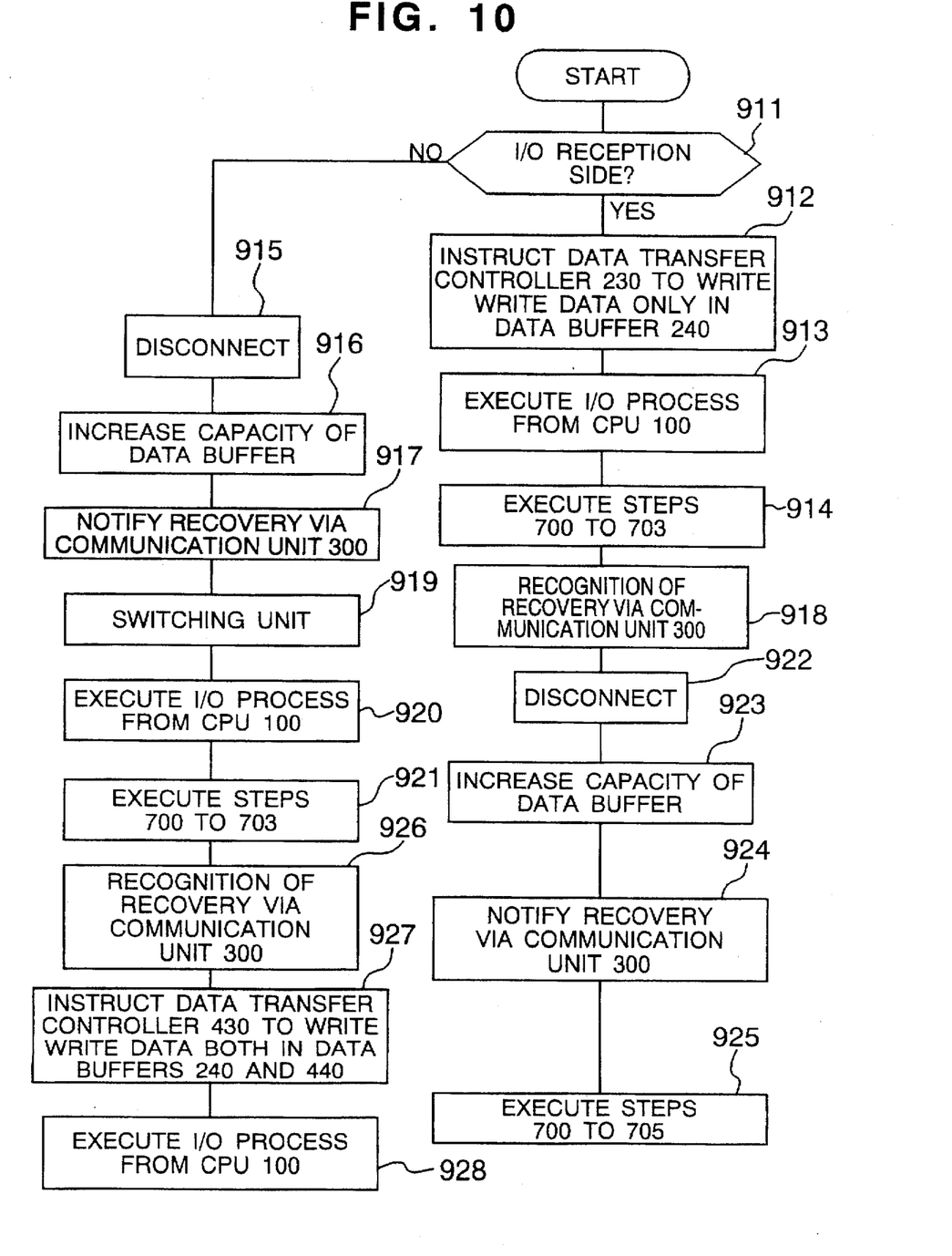
FIG. 10 is a flow chart illustrating an example of the operation of the external storage system of the embodiment.

Further, according to this embodiment, the processes of Steps 916 and 923 shown in FIG. 10 may be used for exchanging microprograms. Therefore, micro-programs in operation can be replaced and the embodiment is particularly effective for recent computer systems requested for severe 24-hour (around-the-clock) running.

During degeneration due to failure of one disk drive controller, a user can select one of the two cases where a completion is reported after write data from the upper level system 100 is written in the data buffer, and where a completion is reported after the write data is written in the disk drive unit 500. Namely, this data transfer mode information 330 can be automatically performed by a user program. Specifically, if only one data buffer is used, response is excellent if a completion is reported when the data is stored in the data buffer. However, if a failure occurs in the disk drive controller at this time, the data cannot be protected. On the other hand, if the report is made when data is stored in the disk drive controller 500, write penalty processes are required. Therefore, although the response is greatly degraded, a reliable report can be supplied to the upper level system 100 and reliability is high. In the external storage system of this embodiment, a user can select as desired either preference for reliability or preference for response speed in accordance with the necessary level of reliability of user files, allowing a flexible file system to be configured.

Still further, the invention can provide a system having a plurality of disk drive controllers of a redundant structure which are not only redundant but also accessible at the same time via a plurality of upper level systems or busses. Examples of the structure of such a system are shown in FIGS. 11 and 12.

Figure 11:
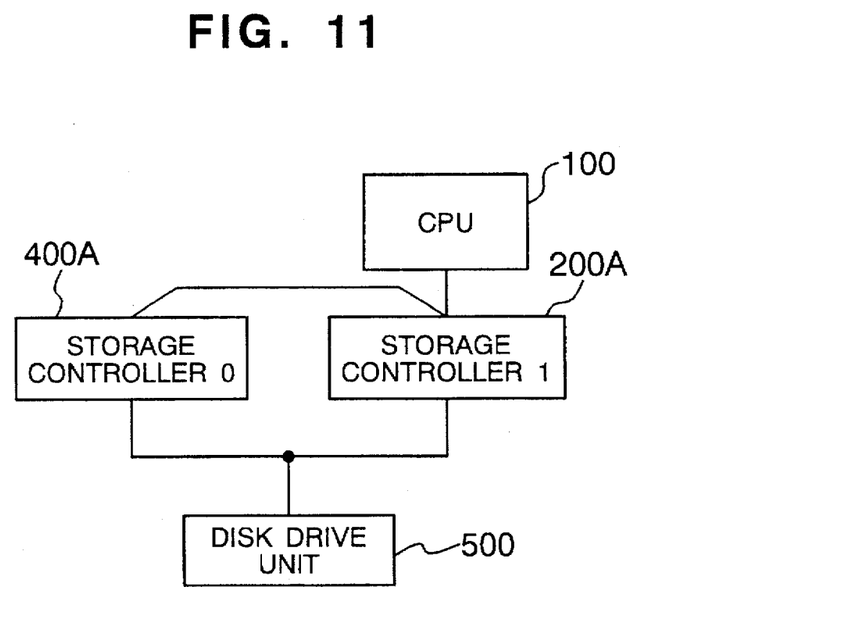
FIG. 11 illustrates the concept of a modification of interconnection to an upper level system of the external storage system of the embodiment.
Figure 12:
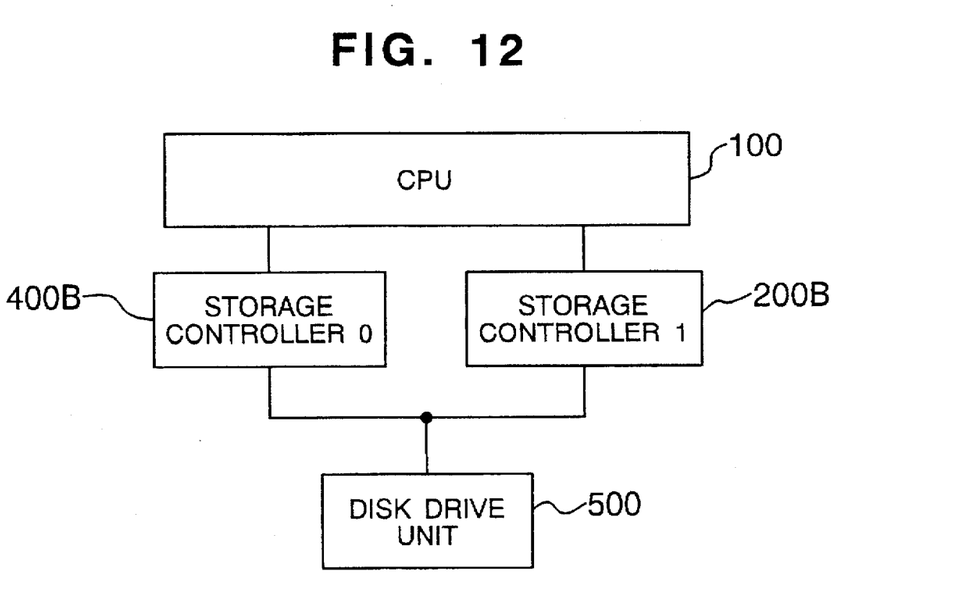
FIG. 12 illustrates the concept of a modification of interconnection to an upper level system of the external storage system of the embodiment.

The system shown in FIG. 11 has the same structure as the system described previously. However, if I/F to the upper level system 100 is SCSI, the structure shown in FIG. 1 uses the same SCSIID shared by both storage controllers 0 and 1 whereas the structure shown in FIG. 11 uses different SCSIIDs for the storage controller 0 (400A) and storage controller 1 (200A). In the structure shown in FIG. 11, both the storage controllers receive an I/O request from the same upper level system 100. FIG. 12 is a block diagram showing an example of the system structure in which a plurality of storage controllers 0 (400B) and 1 (200B) are connected via multi-buses to the same upper level system 100. Also in this structure shown in FIG. 12, the storage controllers 0 (400B) and 1 (200B) can execute an I/O request from the upper level system 100. Designation of which one of the storage controllers executes an I/O request is realized by changing the contents of the host I/O reception information 340 of the common management table 310. Specifically, each storage controller refers to the host I/O reception information 340 to determine whether or not it receives the I/O request from the upper level system. As described above, this invention can deal with various interconnections user desires and can configure flexible systems.

As described so far, according to the embodiment, a plurality of disk drive controllers 200 and 400 of a redundant structure can execute a request from the upper level system 100 while distributing the load. It is therefore possible to provide a file system with not only improved reliability but also improved performance. Further, while all the disk drive controllers 200 and 400 execute an I/O request from the upper level system 100 by distributing the load, the operation continues even upon occurrence of a failure through automatic switching without any instruction from the upper level system 100, and the normal state can be retrieved. Accordingly, while an I/O request from the upper level system 100 is executed, increasing the capacity of data buffers or exchanging microprograms can be performed so that uninterrupted operation can be achieved. All disk drive controllers can be configured not only to be redundant but also to receive a request from the upper level system 100 at the same time. Therefore, various types of file systems users desire can be dealt with flexibly.

According to the external storage system of this invention, a load is distributed into a plurality of storage controllers of a redundant structure. Therefore, advantageous effects of improved reliability and performance can be obtained.

Further advantageous effects obtainable reside in that reliability can be improved through multiple storage controllers and various control operations of the storage controllers can be realized, with transparency of the storage controllers from the upper level system.

Further advantageous effects obtainable reside in that maintenance and management works for hardware, software, and the like of a plurality of storage controllers of a redundant structure can be easily carried out without intercepting the system operation.

Further advantageous effects obtainable reside in that maintenance and management works of a storage controller and data buffer fabricated on the same board can be carried out during the system operation.

What is claimed is:

1. An external storage system comprising:

a storage unit for storing data to be transferred to and from an upper level system;

a plurality of storage controllers provided between said storage unit and said upper level system for controlling data transfer between said upper level system and said storage unit; and a management memory accessible by the plurality of storage controllers for storing management information of the plurality of storage controllers, wherein a first storage controller for receiving an input-output request from said upper level system stores said input-output request in said management memory as load distribution information, and a second storage controller refers to said load distribution information and processes said input/output request received by said first storage controller.

2. An external storage system according to claim 1, wherein said second storage controller stands by during backup for a failure of said first storage controller.

3. An external storage system according to claim 2, wherein said first and second storage controllers have the same address relative to said upper level system.

4. An external storage system according to claim 1, wherein:

said first and second storage controllers each has switching means for switching to one of said first and second storage controllers which controls the data transfer to and from said upper level system;

said management memory stores information on the states of said first and second storage controllers; and said second storage controller monitors a presence/absence of a failure of said first storage controller by referring to said management memory, and when a failure of said first storage controller occurs, said switching means switches to said second storage controller to be used as the storage controller for controlling the data transfer to and from said upper level system.

5. An external storage system according to claim 4, further comprising communication means for communicating with the plurality of storage controllers, wherein when said first storage controller recovers a normal state, said first storage controller notifies said second storage controller of a recovery via said communication means and processes said input/output request received by said second storage controller by referring to said load distribution information.

6. An external storage system comprising:
- a storage unit for storing data to be transferred to and from an upper level system;
- a plurality of storage controllers provided between said storage unit and said upper level system for controlling data transfer between said upper level system and said storage unit, the plurality of storage controllers each having switching means for switching to one of the storage controllers which controls the data transfer to and from said upper level system; and
- a management memory accessible by the plurality of storage controllers for storing information on the states of the plurality of storage controllers,
- wherein a first storage controller monitors a presence/absence of a failure of a second storage controller by referring to said management memory, and the second storage controller with a failure is disconnected.

7. An external storage system according to claim 6, wherein:
- the plurality of storage controllers each include a data buffer for temporarily storing the data and a data transfer controller for controlling data transfer between said upper level system and said data buffer;
- the data transfer controller of said first storage controller is connected to the data buffers of said first and second storage controllers, and first and second modes are provided for data transfer to both the data buffers of the first and second storage controllers in said first mode and only to the data buffer of the first storage controller in said second mode; and
- when said second storage controller is disconnected and if said first mode is selected, said first storage controller selects said second mode.

8. An external storage system according to claim 6, further comprising communication means for communicating with the plurality of storage controllers, wherein:
- when said second storage controller is recovered to a normal state, said second storage controller sends a notice of recovery to said first storage controller by using said communication means, and said first storage controller selects said first mode.

9. An external storage system according to claim 6, wherein:
- said first and second storage controllers each include switching means for switching to one of said first and second storage controllers which controls the data transfer to and from said upper level system; and
- if said second storage controller receives an input-output request from said upper level system and said first storage controller is processing said input-output request received by said second storage controller, said second storage controller is changed to said first storage controller by said switching means as the storage controller which receives an input-output request from said upper level system.

10. An external storage system according to claim 9, further comprising communication means for communicating with the plurality of storage controllers, wherein when said second storage controller recovers a normal state, said second first storage controller notifies said first storage controller of a recovery via said communication means and processes said input/output request received by said first storage controller by referring to load distribution information.

11. An external storage system according to claim 6, wherein said management memory has data transfer mode information indicating a timing of a completion report for a write request from said upper level system whether the completion report is issued when data is written in said data buffer or when the data is written in said memory unit.

12. An external storage system comprising:
- a storage unit for storing data to be transferred to and from an upper level system;
- a plurality of storage controllers provided between said storage unit and said upper level system for controlling data transfer between said upper level system and said storage unit, the plurality of storage controllers each including switching means for switching to one of the storage controllers which controls the data transfer to and from said upper level system;
- communication means for communicating with the plurality of storage controllers; and
- a management memory accessible by the plurality of storage controllers for storing information on the states of the plurality of storage controllers,
- wherein when a maintenance request is issued to the plurality of storage controllers;
- a first storage controller controls the data transfer between the upper level system and the storage unit, and maintenance is performed by disconnecting a second storage controller;
- when said second storage controller is recovered to a normal state, a notice of recover is sent to said first storage controller by using said communication means, and said first storage controller is changed to said second storage controller by said switching means as the storage controller for the data transfer to and from said upper level system;
- said second storage controller controls the data transfer between said upper level system and said storage unit and said first storage controller recognized the notice is disconnected for maintenance; and
- when said first storage controller is recovered to a normal state, a notice of recover is sent to said second storage controller by using said communication means, and said second storage controller recognizes the notice.

13. An external storage system according to claim 12, wherein:
- the plurality of storage controllers each include a data buffer for temporarily storing the data and a data transfer controller for controlling data transfer between said upper level system and said data buffer;
- the data transfer controller of said first storage controller is connected to the data buffers of said first and second storage controllers, and first and second modes are provided for data transfer to both the data buffers of the first and second storage controllers in said first mode and only to the data buffer of the first storage controller in said second mode;
- when a maintenance request is issued to the plurality of storage controllers, and when said second storage controller is disconnected and if said first mode is selected, said first storage controller selects said second mode; and
- said second storage controller recognized the recovery of said first storage controller selects said first mode.

14. An external storage system comprising:
- a storage unit for storing data to be transferred to and from an upper level system;
- a plurality of storage controllers provided between said storage unit and said upper level system for controlling data transfer between said upper level system and said storage unit, the plurality of storage controllers each including: a data buffer for temporarily storing the data; a data transfer controller for controlling data transfer between said upper level system and said data buffer and for transferring said data between said data buffers of said plurality of storage controllers including said data buffer of its own storage controllers; and a DRV transfer controller for controlling data transfer between said data buffer and said storage unit;

a common management memory accessible by the plurality of storage controllers for storing management information of the plurality of storage controllers; and communication means for communicating with the plurality of storage controllers.

15. An external storage system according to claim 14, wherein:

the plurality of storage controllers include a first storage controller for receiving an input-output request from said upper level system and a second storage controller for processing said input-output request received by said first storage controller; and said first storage controller stores information on said input-output request in said common management memory as load distribution information, and said second storage controller refers to said load distribution information and processes said input-output request received by said first storage controller.

16. An external storage system according to claim 14, wherein said second storage controller writes write-requested data in said data buffer in said storage unit via the DRV transfer controller.

17. An external storage system according to claim 14, wherein:

said common management memory stores information on the states of the plurality of storage controllers; and one of said storage controllers monitors a presence/absence of a failure in another storage controller by referring to said common management memory, and the failed storage controller is disconnected.

18. An external storage system according to claim 17, wherein:

the plurality of storage controllers include a first storage controller for receiving an input-output request from said upper level system and a second storage controller for processing said input-output request received by said first storage controller; and when a failure occurs in said first storage controller, said switching means selects said second storage controller as the storage controller which receives said input-output request from said upper level system, and said first storage controller is disconnected.

19. An external storage system according to claim 18, wherein:

when said first storage controller is recovered to a normal state, a notice of recovery is sent to said second storage controller by using said communication means; and said second storage controller recognized the notice stores information on said input/output request in said common management memory as load distribution information, and said first storage controller refers to said load distribution information and processes said input/output request received by said first storage controller.

20. An external storage system according to claim 14, wherein:

the plurality of storage controllers each have a first mode for data transfer between said data transfer controller and each of the data buffers of the plurality of storage controllers and a second mode for data transfer between said data transfer controller and said data buffer in the same storage controller; and when the plurality of storage controllers operate, said first mode is selected, and when only one storage controller operates because one of the storage controllers is disconnected, said second mode is selected.

* * * * *

UNITED STATES PATENT AND TRADEMARK OFFICE
CERTIFICATE OF CORRECTION

PATENT NO. : 5,720,028
DATED : February 17, 1998
INVENTOR(S) : Y. MATSUMOTO, et al.

It is certified that error appears in the above-indentified patent and that said Letters Patent is hereby corrected as shown below:

```
On the title page, left-hand column, after "[22] Filed:
Jun. 5, 1996" insert new line as follows:
--[30] Foreign Application Priority Data
     June 7, 1995 [JP] Japan . . . . . 07-139781--
```

Signed and Sealed this

Twenty-sixth Day of January, 1999

Attest:

Attesting Officer

*Acting Commissioner of Patents and Trademarks*